United States Patent

[11] 3,547,071

| [72] | Inventor | Doron S. Antrim<br>Ramsey, N.J. |
|---|---|---|
| [21] | Appl. No. | 745,499 |
| [22] | Filed | July 17, 1968 |
| [45] | Patented | Dec. 15, 1970 |
| [73] | Assignee | Hoke, Incorporated<br>Cresskill, N.J.<br>a corporation of New York |

[54] DIGITAL TURN INDICATOR
4 Claims, 5 Drawing Figs.

[52] U.S. Cl. .................................................. 116/115
[51] Int. Cl. .................................................. G01p 13/00;
G01d 21/00
[50] Field of Search .................................. 116/115,
115.5, 124, 133(Cursory); 235/117, 123, 103;
192/71; 116/115, 129

[56] References Cited
UNITED STATES PATENTS

| 2,498,399 | 2/1950 | Dodge ........................... | 192/71 |
| 2,901,998 | 9/1959 | Keith ............................ | 116/115 |
| 3,000,560 | 9/1961 | Clancy ......................... | 235/117 |
| 3,151,598 | 10/1964 | Bourns et al. ................. | 116/115 |
| 3,183,885 | 5/1965 | Venema ....................... | 116/124 |
| 3,241,515 | 3/1966 | Franklin ....................... | 116/115X |

*Primary Examiner*—Louis R. Prince
*Assistant Examiner*—Daniel M. Yasich
*Attorney*—Norman N. Holland

ABSTRACT: An indicator for showing the number of turns made by a shaft controlled by a handwheel or knob. A hollow indicator sleeve is mounted in coaxial relationship to the shaft adjacent to the handwheel and a series of indicator numerals are provided on the outer surface of this sleeve. Each time that the handwheel is turned one full turn, a cam controlled ball carried by the handwheel engages the indicator sleeve for a sufficient distance to advance the indicating numbers one digit for each full shaft turn.

PATENTED DEC 15 1970
3,547,071
SHEET 1 OF 2
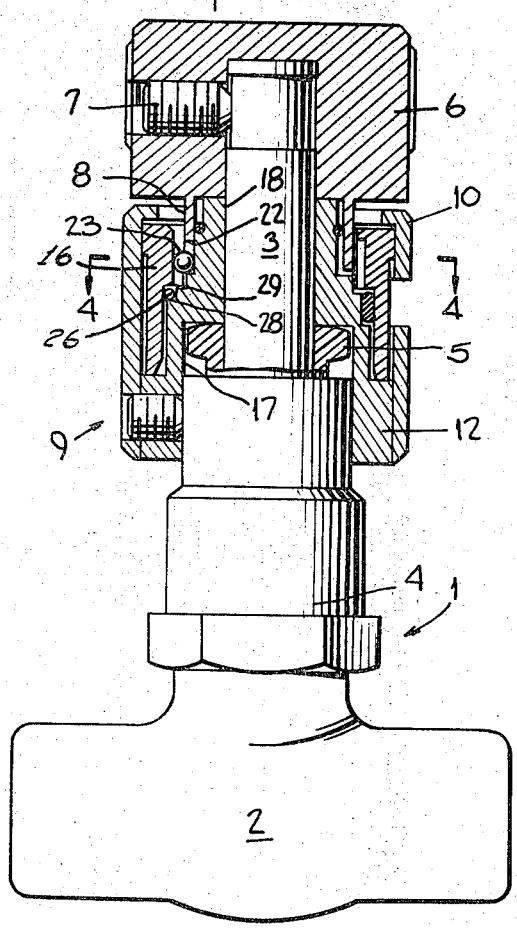
Fig.1.
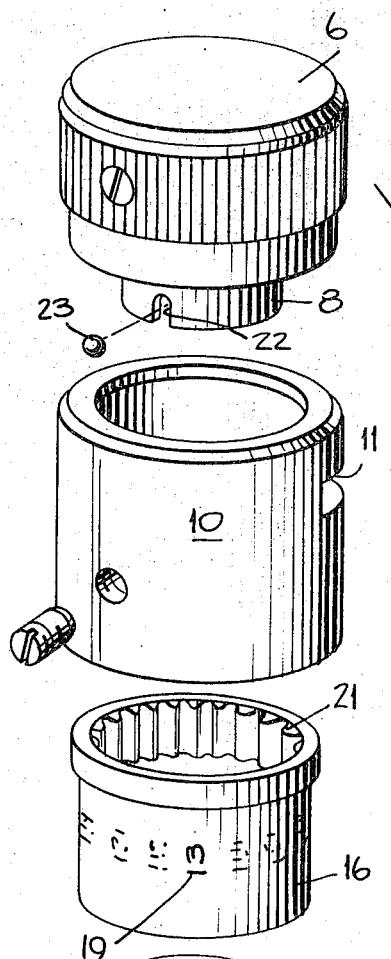
Fig.2.
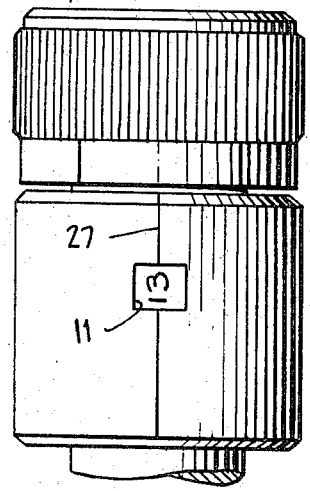
Fig.3.
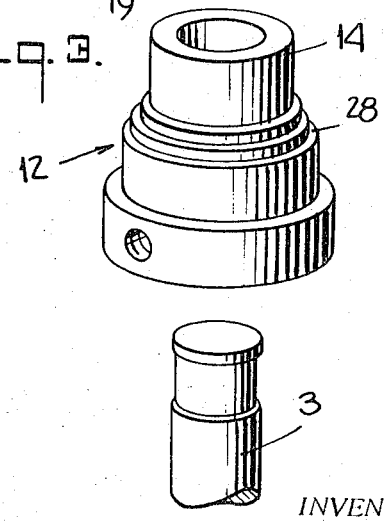
INVENTOR.
DORON S. ANTRIM
BY
Norman O'Hallorn
ATTORNEY

DIGITAL TURN INDICATOR

BACKGROUND OF THE INVENTION

The present invention relates to an indicating means to show the number of turns made by a shaft controlled by a knob or other handwheel. More particularly the invention relates to such an indicator wherein a turn-indicating sleeve is intermittently advanced each time that the shaft-turning knob is rotated one full turn and where this advance of the indicating sleeve is performed by a cooperating ball-and-cam arrangement.

A variety of prior devices of this general type are known. These prior devices have depended on a relatively complicated arrangement of gears or other complexly arranged members to couple the indicating means to the rotating shaft. The prior devices, thus, are not only relatively complicated in themselves and correspondingly delicate but they are also sufficiently complex so that they must be made an integral portion of the measured device during its original manufacture. These prior devices also, due to their complexity, influence to a considerable degree the design of the related areas of the shaft and control wheel and thus pose limitations to the uses suitable for the shaft for which the indication is being provided.

SUMMARY OF THE INVENTION

Accordingly, an object of the present invention is to provide an improved digital indicator for rotating shafts which is relatively simple in its arrangement and which is easily integrated into new designs or added to prior shaft arrangements with only minor modifications of the related structure.

Another object of the present invention is to provide a digital turn count indicator which is relatively simple and composed of relatively few parts.

Another object of the present invention is to provide a digital turn indicator which is easily assembled and attached to the related shaft and control knob.

Another object of the present invention is to provide a digital indicator for a rotating shaft which is positive and exact in its movement and its indication.

Another object of the present invention is to provide a digital shaft turn indicator which is adaptable for manufacture from a variety of materials including materials which may be inert in a particular usage.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification, wherein:

FIG. 1 is a side elevational view partially in section of a preferred embodiment of the indicator;

FIG. 2 is a fragmentary side elevational view of the upper portion of the indicator of FIG. 1;

FIG. 3 is an exploded perspective view showing the several principal elements of the indicator in accordance with the present invention;

Figure 4:
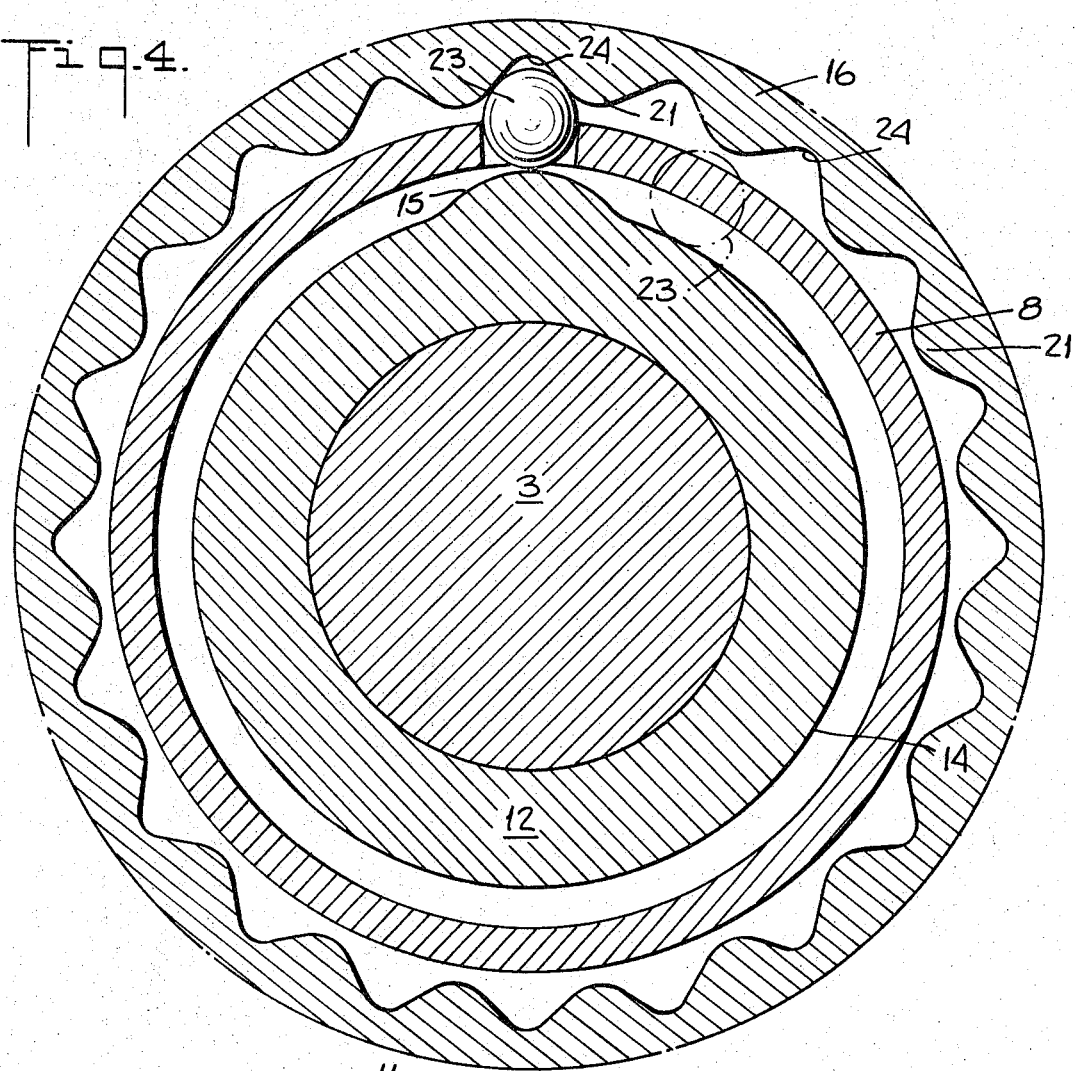
FIG. 4 is a horizontal sectional view of the indicator taken along line 4-4 on FIG. 1.

A turn indicator in accordance with the present invention may be used upon any rotatable shaft where the indicating assembly may be mounted between the hand wheel or turning knob and the shaft bearing or other support structure. It is thus clear that the indicator may be used upon a variety of articles employing rotatable shafts where an indication of the shaft position between a zero position and a reasonably large number of turns is to be made available to the operator by a directly viewed indicator.

The description below describes the indicator as used on a typical metering valve where the indicator shows the number of turns of the valve-closing spindle or stem. This is particularly useful application for this invention and the combination of the indicator with the valve structure as described is particularly advantageous, however, it is clear that other articles are equally adaptable for use with the indicator.

FIG. 1 shows a metering valve 1 having a body 2 where the fluid flow through the valve is controlled by the rotation of the shaft-like spindle or stem 3 extending upwardly through a bonnet 4 from the valve body through a packing held in the valve bonnet by a suitable packing nut 5. This spindle 3 is controlled by a knob or handwheel 6 attached by suitable setscrew 7 to the outer end of the spindle 3.

The preferred embodiment of the handwheel 6 illustrated includes a depending generally cylindrical ball engaging cage 8 which cooperates with the remaining elements in the indicator 9 for providing an indication of the spindle position as will now be described in greater detail.

The indicator 9 assembly includes an outer hollow sleeve 10 surrounding the assembly and having an aperture or window 11 through which the turn indication is read. This outer sleeve 10 fits over and is attached to the lower portion of an inner cam member 12. The cam member 12 surrounds the upper portion of the bonnet 4 or other shaft housing to support the indicator assembly. The cam member 12 includes a cam surface 14, including a sleeve-advancing projection 15 (FIGS. 4 and 5) for advancing the indicator ring 16 which is slidably mounted between the outer sleeve 10 and the cam member 12.

Preferably the cam member 12 has its lower portion provided with suitable hole 17 for mounting and centering the cam member 12 on the bonnet 4 and is provided at the top with a smaller hole 18 for slidably engaging the upper portion of the spindle 3. The indicator ring 16 has a generally cylindrical shape as illustrated in FIG. 3 and has a series of indicating numbers 19 applied to its outer surface. A corresponding number of teeth 21 are provided on its inner surface which act to advance the indicator ring 16 in a manner which will now be described.

The downwardly projecting cage 8 on the handwheel 6 includes a slot 22 for rotatably containing a sleeve advancing ball 23. The ball 23 makes one revolution around the cam member 12 for each corresponding revolution of the handwheel 6.

Figure 5:
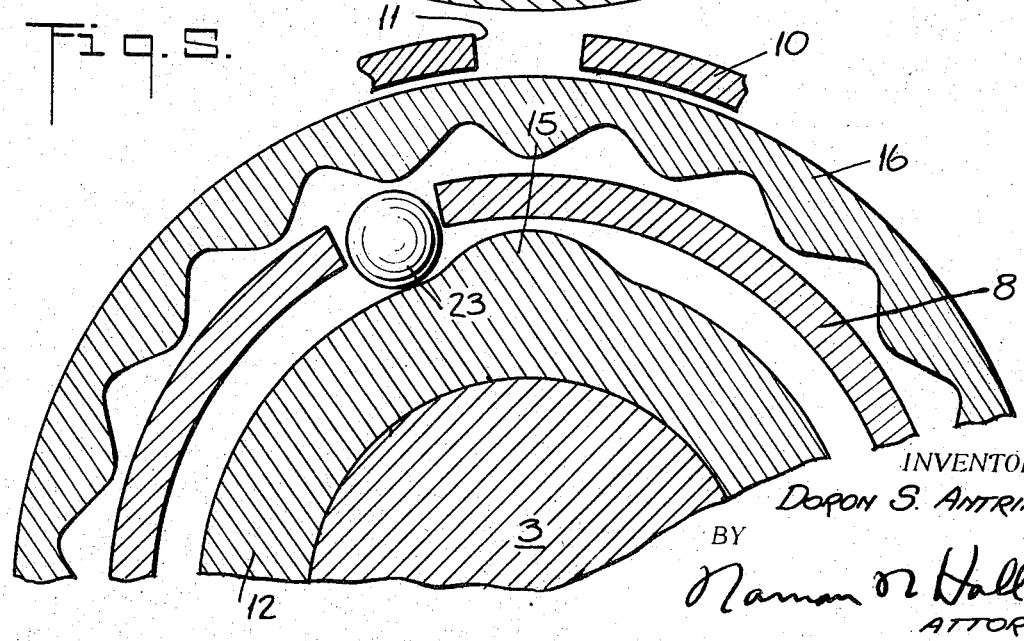
FIG. 5 is a fragmentary horizontal sectional view corresponding to FIG. 4 illustrating the movement of the indicator ring and the ring-moving ball.

FIGS. 4 and 5 are sectional views showing the relative positions of the indicator ring 16, teeth 21, the ball 23, and the cam surface 14 of the cam member 12.

It will be seen that each time that the ball 23 reaches and engages the indicator advancing projection 15 on the cam surface 14, the ball 23 is moved radially outwardly into a slot 24 between two indicator ring teeth 21. This position of the ball 23 forces the indicator ring 16 to move a predetermined amount as the ball 23 is held between a slot 24 and the projection 15. These portions of the cam surface 14 and the indicator ring 16 are shaped to advance the indicator ring 16 a distance corresponding to one indicator number. Thus, it is seen that each full rotation of the handwheel 6 advances the indicator ring 16 to move the next higher indicator number into view in the indicating aperture 11.

The ball 23 is seen to be rotatably mounted for movement in the slot 22 and within a channel or race formed between the teeth 21 of the indicator ring 16, a circular step or flange 25 on the cam member 12 and the cam surface 14 on the cam member 12. While a slot such as slot 22 is preferably provided in the collar for containing the ball 23 as it facilitates removal of the handwheel 6, it is clear that the ball 23 may also be contained in a suitable hole or aperture formed in the collar and also that the depending member or collar 8 on the handwheel 6 which has a cylindrical form in a performed embodiment, may have different shapes and need not, for example, extend completely around the spindle 3. The coupling member which is the ball 23 may also have a differing shape such as a cylindrical or other form.

FIG. 4 illustrates in dash-dot lines a ball in advance of the cam projection 15. In this position, it is seen that the ball 23 is moving between the cam surface 14 and the indicator ring teeth 21 without contacting the teeth and thus without advancing the indicator ring 16. The ball 23 shown in solid lines has moved radially outwardly and is engaging adjacent teeth 21 of the indicator ring 16 so that the ring 16 at this time is advancing with the ball 23 and with the handwheel 6.

FIG. 5 shows the ball 23 after it has moved inwardly off the projection 15 and is again clear of the indicator ring teeth 21. As seen in this figure, a portion of the indicator ring bearing an indicating numeral will have now been moved adjacent of the window 11 in the sleeve 10 showing that the spindle 3 has now been moved one full turn.

Fractions of a turn are indicated by dividing the circumference of the handwheel 6 into ten parts with suitable markings placed thereon as indicated at 26 in FIG. 2. These marks when referred to a suitable index line such as the line 27 give an indication of the fractional movement of the handwheel 6.

In order to keep the indicator ring 16 firmly in its correct position, a friction spring 26 or other member such as an O-ring may be placed in a circular channel such as the channel illustrated in FIG. 1 which is formed between cooperating ledge 29 on the indicator ring 16 and the ledge 28 on the cam member 12.

The indicator assembly of this invention may be used with a shaft having no axial movement. It is also clear, however, that a ball and slot arrangement may be provided with a slot formed sufficiently long to permit the collar 8 on the handwheel 6 to move axially with the spindle 3 while still retaining the ball in proper position between the indicator ring 16 and the cam surface 14 of the cam member 12.

It will be seen that the present invention provides an improved accurate digital indicator for valve stems or spindles or for other rotated members. The indicator is particularly advantageous due to its relatively simple design which not only makes it reliable but which also permits it to be adapted or made a part of existing designs with little or no modifications being acquired for the monitored shaft or the supporting members. This advantage is particularly valuable where the indicator is applied to a metered valve or other valve of the general type described herein where the indicator assembly is conveniently mounted on the valve bonnet adjacent to the valve bonnet and to the regular valve handle or control wheel.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. Means for indicating the number of rotations of a shaft comprising the combination of a rotatable shaft, a mounting for said shaft, an indicator ring surrounding said shaft and having plurality of inwardly projecting teeth, a plurality of spaced indicator marks on an outer surface of said ring, a cam member attached to said shaft mounting and surrounding said shaft within said indicator ring, said cam member having a closed cam surface including a radially extended portion, a rolling indicator ring turning member positioned between said cam surface and said indicator ring, means on said shaft for moving said ring turning member along said cam surface in synchronization with shaft rotation such that said ring turning member is moved outwardly by said radially extended portion of the cam member and is engaged between said inwardly projecting teeth on said indicator ring thereby moving the indicator ring a preselected distance for every full rotation of said shaft.

2. The means as claimed in claim 1 which further comprises an apertured outer sleeve surrounding and being attached to said shaft mounting.

3. The means as claimed in claim 1 in which said ring turning member comprises a ball.

4. The means as claimed in claim 1 in which said ring turning member comprises a roller.